United States Patent
Nguyen et al.

(10) Patent No.: US 10,534,940 B2
(45) Date of Patent: *Jan. 14, 2020

(54) EMPHASIZING EQUIPMENT BASED ON AN EQUIPMENT TAG

(71) Applicant: Rockwell Automation Technologies, Inc., Mayfield Heights, OH (US)

(72) Inventors: Thong T. Nguyen, New Berlin, WI (US); Alex L. Nicoll, Brookfield, WI (US); Calvin C. Steinweg, Hartford, WI (US); Paul D. Schmirler, Glendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,192

(22) Filed: Oct. 29, 2018

(65) Prior Publication Data

US 2019/0087614 A1  Mar. 21, 2019

Related U.S. Application Data

(63) Continuation of application No. 15/718,513, filed on Sep. 28, 2017, now Pat. No. 10,185,848.

(60) Provisional application No. 62/418,474, filed on Nov. 7, 2016.

(51) Int. Cl.
*G06K 7/08* (2006.01)
*G06K 7/10* (2006.01)
*G06Q 10/08* (2012.01)
*G06K 7/14* (2006.01)

(52) U.S. Cl.
CPC ....... *G06K 7/10297* (2013.01); *G06K 7/1413* (2013.01); *G06K 7/1417* (2013.01); *G06Q 10/08* (2013.01); *G06Q 10/087* (2013.01)

(58) Field of Classification Search
CPC ...... G06K 7/0008; G06F 3/1454; G06F 3/147
USPC ........................................................ 235/451
See application file for complete search history.

(56) References Cited

U.S. PATENT DOCUMENTS

| | | | |
|---|---|---|---|
| 10,185,848 B2 * | 1/2019 | Nguyen | G06K 7/10297 |
| 2009/0175499 A1 | 7/2009 | Rosenblatt | |
| 2011/0106576 A1 | 5/2011 | Hou et al. | |
| 2013/0246539 A1 | 9/2013 | Davis | |
| 2014/0009291 A1 | 1/2014 | Requist et al. | |
| 2014/0091141 A1 | 4/2014 | Armitage et al. | |

(Continued)

FOREIGN PATENT DOCUMENTS

EP  3032480 A1  6/2016

OTHER PUBLICATIONS

European Patent Office, Extended European Search Report, dated Jan. 18, 2018, pp. 1-7.

(Continued)

*Primary Examiner* — Ahshik Kim
(74) *Attorney, Agent, or Firm* — Kunzler Bean & Adamson

(57) ABSTRACT

For emphasizing equipment based on an equipment tag, a processor receives a given equipment reference code for a given equipment instance. The processor further identifies one or more equipment tags in the image. Each equipment tag corresponds to a unique equipment reference code. The processor identifies a given equipment tag corresponding to the given equipment reference code in the image. In addition, the processor emphasizes the given equipment instance in the image presented on the display.

20 Claims, 17 Drawing Sheets

(56) References Cited

U.S. PATENT DOCUMENTS

2015/0049113 A1* 2/2015 Rahman ................ G06T 19/006
 345/633
2018/0300917 A1* 10/2018 Barnett .................. G06T 11/60

OTHER PUBLICATIONS

U.S. Appl. No. 15/718,513, Office Action Summary, dated May 14, 2018, pp. 1-12.

* cited by examiner

201 →

| Equipment Reference Code 205 |
| Catalog Identifier 401 |
| Serial Number 403 |
| Device Rating 405 |
| MAC Address 407 |
| Manufacture Date 409 |
| Warranty Reference 411 |
| User Manual Reference 413 |
| Operational Reference 415 |
| Diagnostic Reference 417 |
| Installation Reference 419 |
| Wiring Panel identifier 421 |
| Identification Vector 423 |
| Tag Location 427 |
| URL 429 |

| Equipment Reference Code 205 |
| Menu 451 |
| Interior View 453 |
| Virtual Tags 455 |
| Schematic Drawing 457 |
| Elevation Drawing 459 |
| Pointer to Operational Data 461 |
| User Manual 463 |
| Operations Manual 465 |
| Diagnostic Manual 467 |
| Installation Manual 469 |
| Warranty Information 471 |
| Virtual Tag Map 473 |

| Device Location |
| :---: |
| 433 |
| Facility Vector |
| 431 |
| Location Vector |
| 435 |
| Equipment Panel Data |
| 437 |
| Location Table |
| 439 |

FIG. 2E

EMPHASIZING EQUIPMENT BASED ON AN EQUIPMENT TAG

CROSS-REFERENCE TO RELATED APPLICATIONS

This is a continuation application claiming priority to U.S. patent application Ser. No. 15/718,513 entitled "EMPHASIZING EQUIPMENT BASED ON AN EQUIPMENT TAG" and filed on Sep. 28, 2017 for Thong T. Nguyen, which is incorporated herein by reference and claims priority to U.S. Provisional Patent Application 62/418,474 entitled "IDENTIFYING EQUIPMENT FROM AN EQUIPMENT TAG" and filed on Nov. 7, 2016 for Thong T. Nguyen, which is incorporated herein by reference.

BACKGROUND INFORMATION

The subject matter disclosed herein relates to locating equipment based on an equipment tag.

BRIEF DESCRIPTION

An electronic device for emphasizing equipment based on an equipment tag is disclosed. The electronic device includes a camera, a display, a processor, and a memory. The camera captures an image. The display presents the image. The processor receives a given equipment reference code for a given equipment instance. The processor further identifies one or more equipment tags in the image. Each equipment tag corresponds to a unique equipment reference code. The processor identifies a given equipment tag corresponding to the given equipment reference code in the image. In addition, the processor emphasizes the given equipment instance in the image presented on the display. A method and computer program product also disclose the functions of the electronic device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2C is a schematic block diagram of code data according to an embodiment;

FIG. 2E is a schematic block diagram of system data according to an embodiment;

DETAILED DESCRIPTION

Figure 1A:
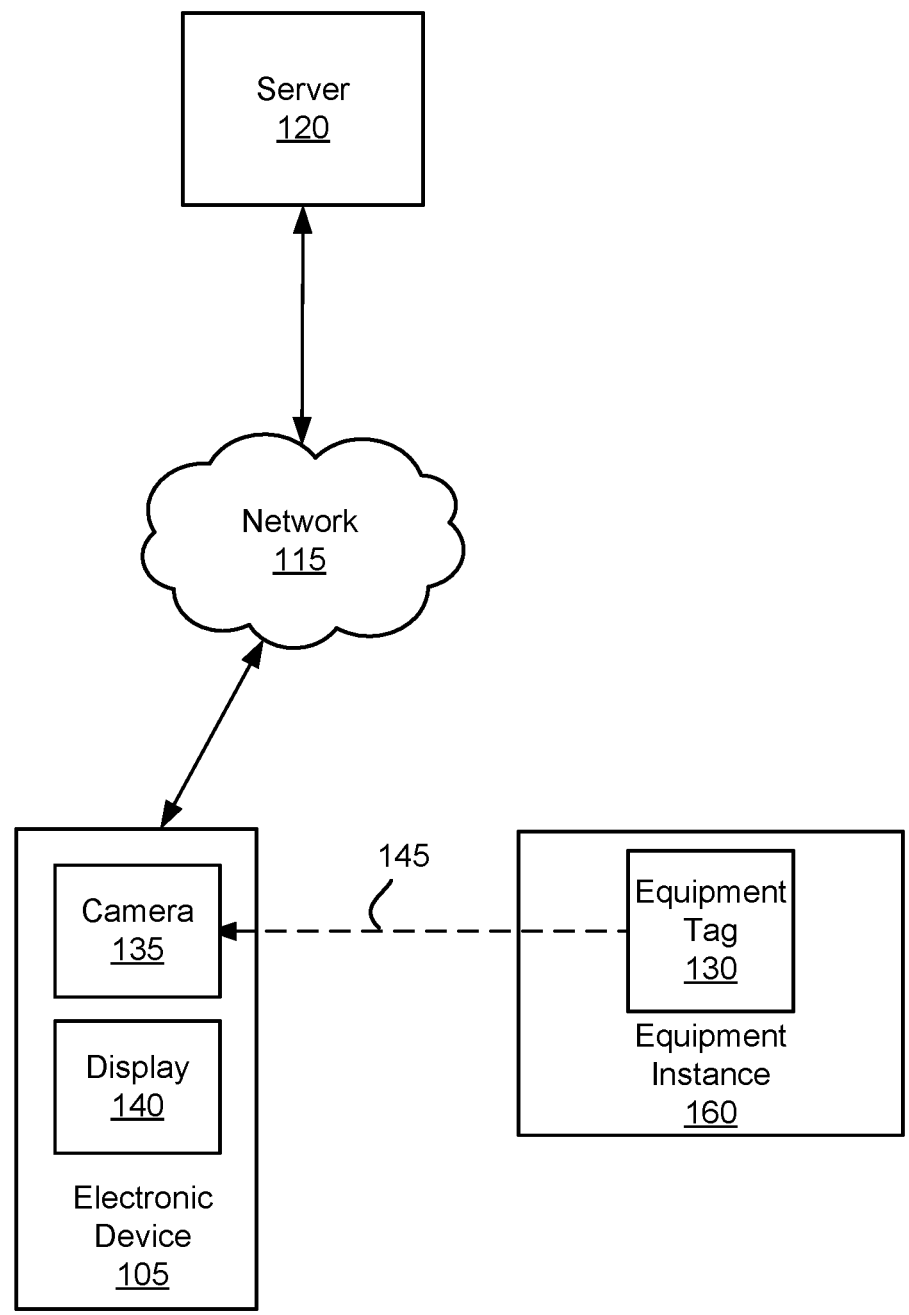
FIG. 1A is a schematic block diagram of an equipment identification system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object-oriented programming language such as Java, Smalltalk, C++, C#, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of an equipment identification system 100. The equipment identification system 100 may identify and emphasize an equipment instance 160 using an electronic device 105. In the depicted embodiment, the system 100 includes a server 120, a network 115, the electronic device 105, and the equipment instance 160.

The equipment instance 160 may be selected from the group consisting of an equipment panel, a slot of the equipment panel, a device disposed in a slot, and a discrete device. The network 115 may be the Internet, a wide-area network, a local area network, a mobile telephone network, a Wi-Fi network, or combinations thereof. The electronic device 105 may be selected from the group consisting of an augmented-reality display, a computer tablet, a watch, a wearable device, and a mobile telephone.

The electronic device 105 may include a camera 135 and a display 140. The camera 135 may capture an image 145 of the equipment instance 160 and an equipment tag 130 disposed on the equipment instance 160. The equipment tag 130 may be selected from the group consisting of a two-dimensional optical code, a Quick Response (QR) code, a bar code, a Universal Product Code (UPC), a BLUETOOTH® Low Energy (BLE) Tag, a Radio Frequency Identifier (RFID), a Near Field Communication (NFC) tag, and a Europay, Mastercard, Visa (EMV) tag. In one embodiment, two or more types of equipment tag 130 may be employed concurrently.

The server 120 may store one or more databases that are used by the electronic device 105. The server 120 and the electronic device 105 may communicate through the network 115.

The system 100 may be used in an environment with a plurality of equipment instances 160. In addition, many of the equipment instances 160 may appear to be similar and/or identical. For example, differences between equipment panels may not be readily apparent to user. As a result, it may be difficult to locate a desired equipment instance 160.

The embodiments described herein identify a given equipment tag 130 in an image that corresponds to a given equipment reference code for a desired equipment instance 160. In addition, the embodiments may emphasize the given equipment instance 160 in the image presented on the display 140. As a result, the user may be able to quickly identify the desired equipment instance 160 as will be described hereafter.

Figure 1B:
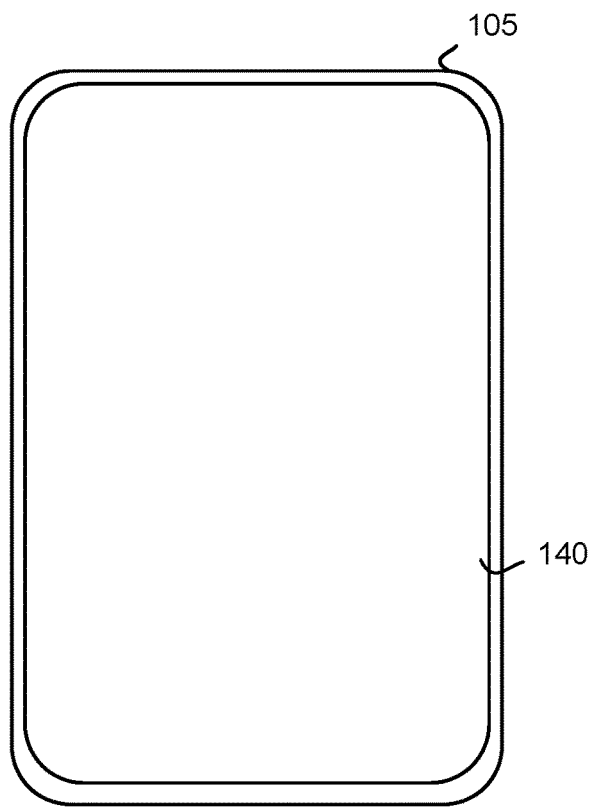
FIG. 1B is a front view drawing of a tablet computer according to an embodiment.

FIG. 1B is a front view drawing of a tablet computer electronic device 105. The tablet computer electronic device 105 includes a display 140 and a camera 135 (not shown). In addition, the tablet computer electronic device 105 includes a computer.

Figure 1C:
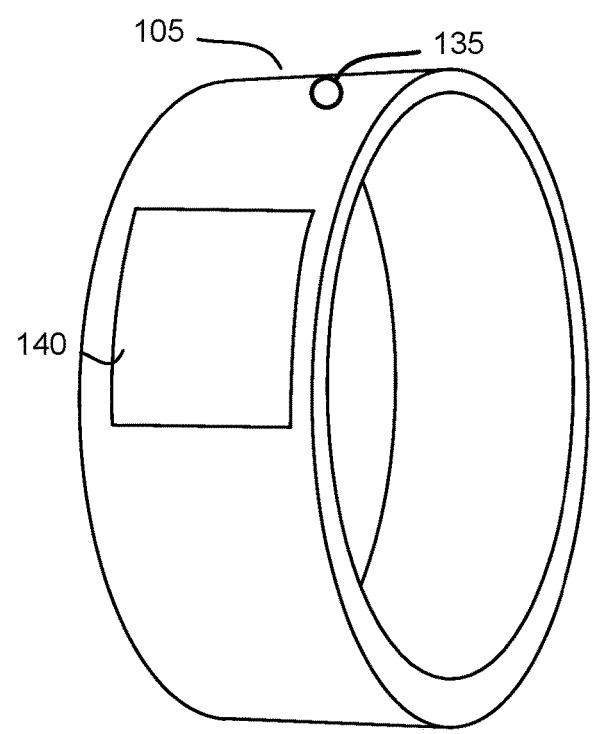
FIG. 1C is a perspective drawing of a wearable device according to an embodiment.

FIG. 1C is a perspective drawing of a wearable device electronic device 105. The wearable device electronic device 105 is shown as a watch and/or bracelet. The wearable device electronic device 105 includes a display 140 and a camera 135. In one embodiment, the wearable device electronic device 105 includes a computer.

Figure 1D:
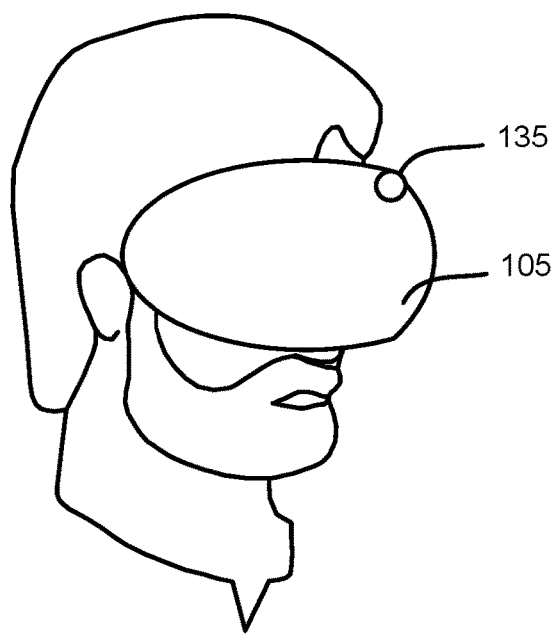
FIG. 1D is a perspective drawing of an augmented reality display according to an embodiment.

FIG. 1D is a perspective drawing of an augmented reality display electronic device 105. In one embodiment, the augmented-reality display is worn over the eyes of the user and displays both physical objects in the user's field-of-view that are captured by a camera 135 and virtual objects such as virtual controls on an internal display (not shown). In one embodiment, the augmented reality display electronic device 105 includes a computer.

Figure 2A:
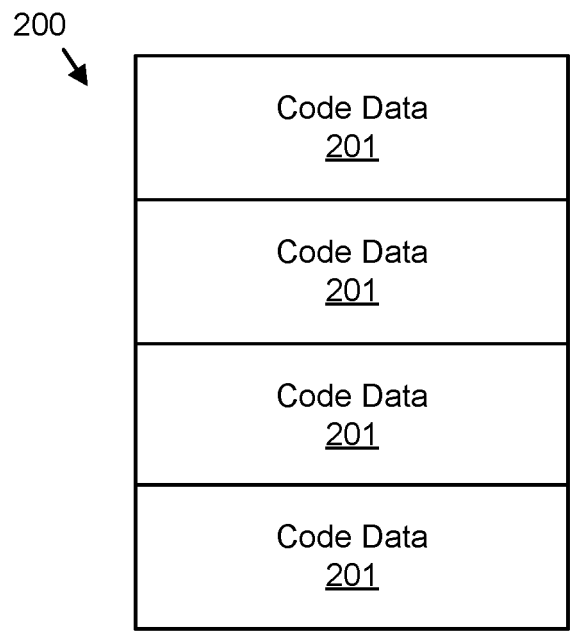
FIG. 2A is a schematic block diagram of a code database according to an embodiment.

FIG. 2A is a schematic block diagram of a code database 200. The code database 200 may be organized as a data structure in a memory. The code database 200 may include a plurality of code data 201. The code database 200 may be stored in one or more of the server 120 and the electronic device 105.

Figure 2B:
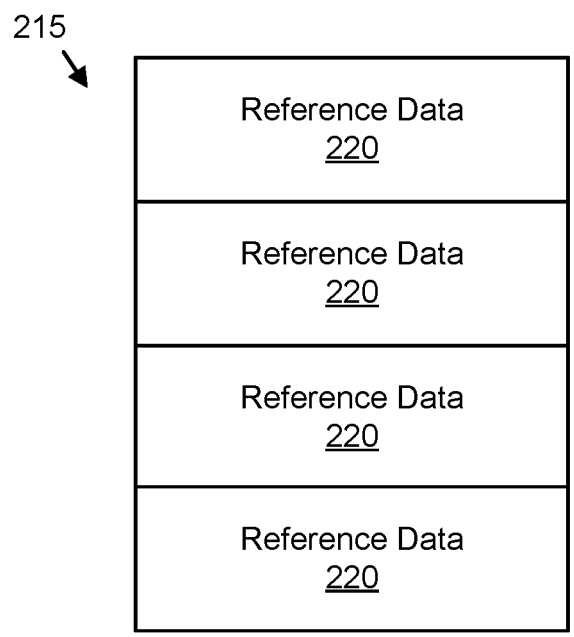
FIG. 2B is a schematic block diagram of a reference database according to an embodiment.

FIG. 2B is a schematic block diagram of a reference database 215. The reference database 215 may be organized as a data structure in a memory. The reference database 215 includes a plurality of reference data 220. The reference database 215 may be stored in one or more of the server 120 and the electronic device 105.

FIG. 2C is a schematic block diagram of the code data 201. The code data 201 may be organized as a data structure in a memory. In the depicted embodiment, the code data 201 includes an equipment reference code 205, a catalog identifier 401, a serial number 403, a device rating 405, a Media Access Control (MAC) address 407, a manufacture date 409, a warranty reference 411, a user manual reference 413, an operational reference 415, a diagnostic reference 417, an installation reference 419, a wiring panel identifier 421, an identification vector 423, a tag location 427, and a Universal Resource Locator (URL) 429.

The equipment reference code 205 may uniquely identify a single equipment instance 160. In one embodiment, the equipment reference code 205 includes a serial number. The equipment reference code 205 may be encoded in the equipment tag 130.

The catalog identifier 401 may point to a reference to the equipment instance 160 in a catalog. In one embodiment, the catalog identifier 401 includes a model number. The serial number 403 may be the serial number assigned by the manufacturer for the equipment instance 160.

The device rating 405 may specify one or more parameters for the equipment instance 160. For example, the device rating 405 may specify a maximum current, a maximum torque, and the like. The MAC address 407 may identify the equipment instance 160 on the network 115. The manufacture date 409 may be the date of manufacture specified for the equipment instance 160.

The warranty reference 411 may point to warranty information for the equipment instance 160. The user manual reference 413 may point to a user manual for the equipment instance 160. The operational reference 415 may point to an operations manual for the equipment instance 160. The diagnostic reference 417 may point to a diagnostic manual for the equipment instance 160. The installation reference 419 may point to an installation manual for the equipment instance 160.

The wiring panel identifier 421 may uniquely identify a wiring panel. In one embodiment, the wiring panel identifier 421 includes an equipment reference code 205 for the wiring panel.

The identification vector 423 may encode a location of the equipment tag 130 as a vector comprising a plurality of elements. In one embodiment, the vector is a binary vector wherein each element is a binary value. The identification vector 423 may be manipulated with a facility vector in order to determine a location of the electronic device 105. The manipulation of the identification vector 423 with the facility vector greatly accelerates locating the equipment instance 160 within a facility. As a result, the equipment instance 160 is rapidly identified and located.

The tag location 427 identifies the location of the equipment tag 130 and the corresponding equipment instance 160. The tag location 427 may include a physical address, physical coordinates, a reference grid coordinate within a facility, a locator string, and the like. In one embodiment, the tag location 427 includes a map of the facility with the equipment instance 160 identified on the map.

The URL 429 may address the equipment instance 160. In addition, the URL 429 may address reference data 220 for the equipment instance 160.

The code data 201 may be encoded in the equipment tag 130. In one embodiment, one or more of the equipment reference code 205, the catalog identifier 401, the serial number 403, the device rating 405, the MAC address 407, the manufacture date 409, the warranty reference 411, the user manual reference 413, the operational reference 415, the diagnostic reference 417, the installation reference 419, the wiring panel identifier 421, the identification vector 423, the tag location 427, and the URL 429 may be encoded in the equipment tag 130. In addition, portions of the code data 201 may be encrypted. Alternatively, portions of the code data 201 may be hashed. In a certain embodiment, the equipment reference code 205 is parsed from the equipment tag 130 and used as an index to retrieve the code data 201 from the code database 200.

Figure 2D:
FIG. 2D is a schematic block diagram of reference data according to an embodiment.

FIG. 2D is a schematic block diagram of reference data 220. The reference data 220 may be presented on the display 140 of the electronic device 105. The reference data 220 may be organized as a data structure in a memory. In the depicted embodiment, the reference data 220 includes the equipment reference code 205, one or more menus 451, an interior view 453, virtual tags 455, one or more schematic drawings 457, one or more elevation drawings 459, a pointer to operational data 461, the user manual 463, the operations manual 465, the diagnostic manual 467, the installation manual 469, the warranty information 471, and a virtual tag map 473.

The equipment reference code 205 may be used to index the reference data 220 in the reference database 215. The one or more menus 451 may identify menus that may be presented in the display 140 to aid a user in navigating the reference data 220. In addition, the one or more menus 451 may identify menus that may be navigated to control the equipment instance 160.

The interior view 453 may include an image of an interior of the equipment instance 160. In one embodiment, the image of the interior comprises multiple layers. The image of the interior may be organized as an x-ray image, a hidden line image, or the like. The interior view 453 may be presented to show a user the interior of the equipment instance 160.

The virtual tags 455 may specify one or more tags that may be presented on the display 140 to identify one or more equipment elements of the equipment instance 160. An equipment element may be a portion of the equipment instance 160, a component of the equipment instance 160, or the like. In one embodiment, each virtual tag 455 has an appearance and/or an organization of an equipment tag 130. A virtual tag 455 may be presented adjacent to an equipment element. Alternatively, the virtual tag 455 may be presented as though disposed on the equipment element. The virtual tag map 473 may specify a location and/or orientation of each virtual tag 455 relative to the equipment instance 160.

The one or more schematic drawings 457 may describe electrical circuits of the equipment instance 160. In one embodiment, the schematic drawings 457 may be organized in a hierarchy of drawings. Equipment elements such as functional blocks in each drawing may be marked with a virtual tag 455. Selecting the virtual tag 455 for a block may present a more detailed schematic drawing 457. The elevation drawing 459 may describe mechanical features of the equipment instance 160. Equipment elements of the elevation drawing 459 may be marked with the virtual tag 455. Selecting the virtual tag 455 for an equipment element may present a more detailed view of the equipment element.

The pointer to operational data 461 may reference one or more data structures in a memory that store operational data for the equipment instance 160. For example, the operational data may include a current measurement and a torque measurement for the equipment instance 160. The pointer to the operational data 461 may be used to retrieve the current measurement and the torque measurement. In an alternative embodiment, the pointer to the operational data 461 comprises an application programming interface (API) for retrieving the operational data.

The user manual 463 may be an electronic user manual for the equipment instance 160. The operations manual 465 may be an electronic operations manual for the equipment instance 160. The diagnostic manual 467 may be an electronic diagnostic manual for the equipment instance 160. The installation manual 469 may be an electronic installation manual for the equipment instance 160. The warranty information 471 may describe a manufacturer's warranty, an installers warranty, key warranty related dates, or combinations thereof.

FIG. 2E is a schematic block diagram of system data. The system data may be organized as a data structure in a memory. In the depicted embodiment, the system data includes a device location 433, the facility vector 431, a location vector 435, equipment panel data 437, and a location table 439.

The device location 433 may locate the electronic device 105. The device location 433 may be determined from the tag location 427. The device location 425 may be set equal to a tag location 427. In addition, the device location 433 may be modified from the tag location 427. For example, the device location 433 may be estimated from a combination of the tag location 427 and a view of the equipment tag 130. In one embodiment, the device location 433 includes an orientation of the electronic device 105. In addition, the device location 433 may include an orientation of the user.

The facility vector 431 may be a vector that is encoded such that when manipulated along with the identification vector 423, a location of the equipment tag 130 and/or the electronic device 105 may be rapidly determined. In one embodiment, the location vector 435 is calculated as a function of the identification vector 423 and the facility vector 431. The location vector 435 may be a vector description of the device location 433 and/or the tag location 427. The location vector LV 435 may be calculated using Equation 1, where IV is the identification vector 423 and FV is the facility vector 431.

$$LV = IV \oplus FV \quad \text{Equation 1}$$

The location vector 435 may identify the location of the equipment tag 130 and/or electronic device 105. The location table 439 may include entries for a plurality of locations indexed by location vectors 435. In one embodiment, the location vector 435 is used as an index to the location table 439 to identify the location of the equipment tag 130 and/or electronic device 105.

The equipment panel data 437 may record relationships between equipment instances of an equipment panel. For example, the equipment panel data 437 may describe physical and logical locations for each equipment instance 160. In addition, the equipment panel data 437 may describe associations between device equipment instances 160 and slot equipment instances 160.

Figure 3A:
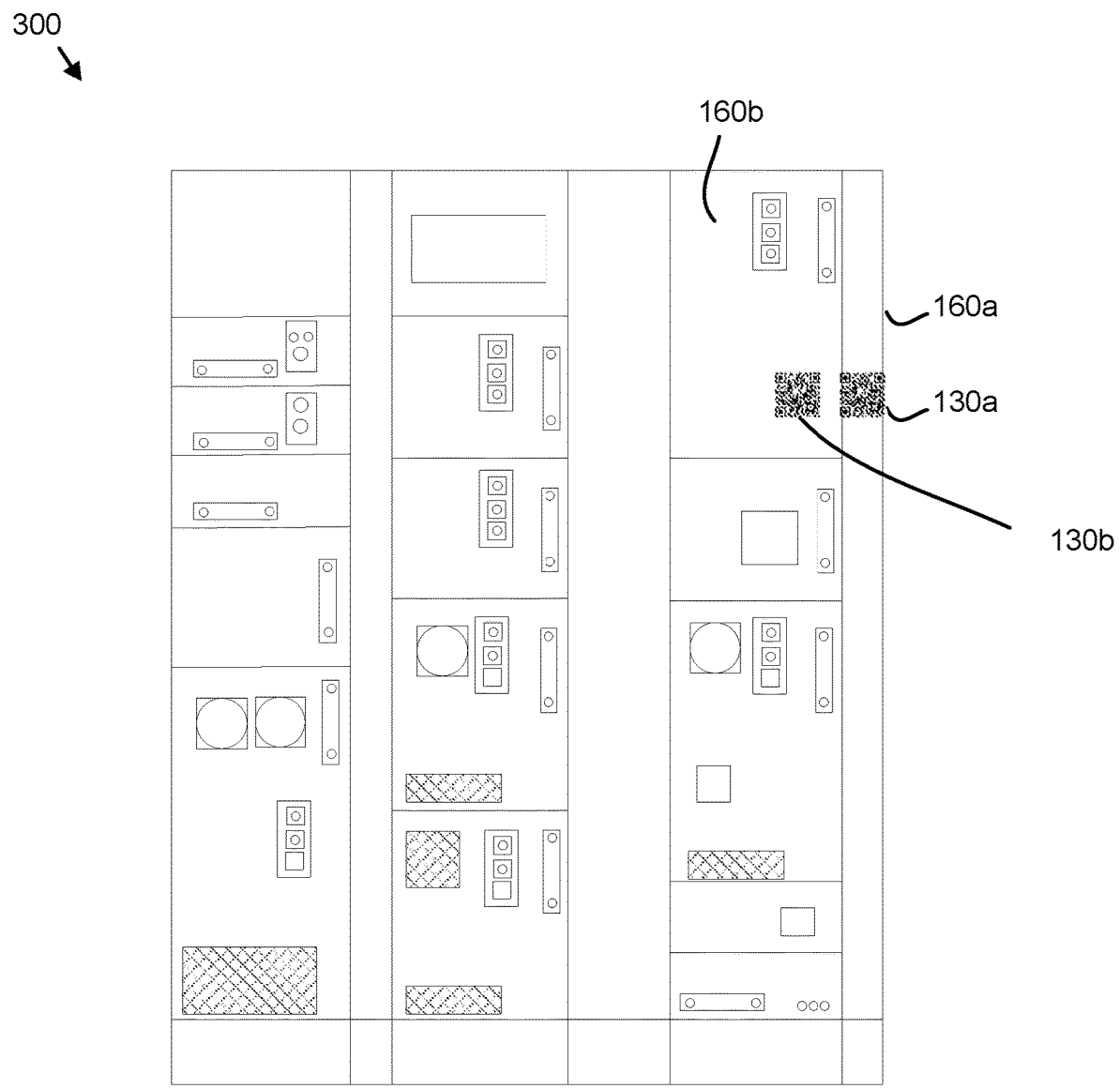
FIG. 3A is a front view drawing of an equipment panel according to an embodiment.

FIG. 3A is a front view drawing of an equipment panel 300. The equipment panel 300 may be disposed in an industrial environment. The equipment panel 300 may be an equipment instance 160. In addition, the equipment panel 300 may include a plurality of equipment instances 160. In the depicted embodiment, the equipment panel 300 includes a slot equipment instance 160a, referred to hereafter as a slot. In addition, the equipment panel 300 may include a device equipment instance 160b, referred to hereafter as a device.

Equipment tags 130 may be disposed on one or more equipment instances 160. In one embodiment, the camera 135 captures an image 145 of the equipment panel 300. The electronic device 105 may identify one or more equipment tags 130 in the image 145. The electronic device 105 may further identify a given equipment tag 130 that corresponds to a given equipment reference code 205.

Figure 3B:
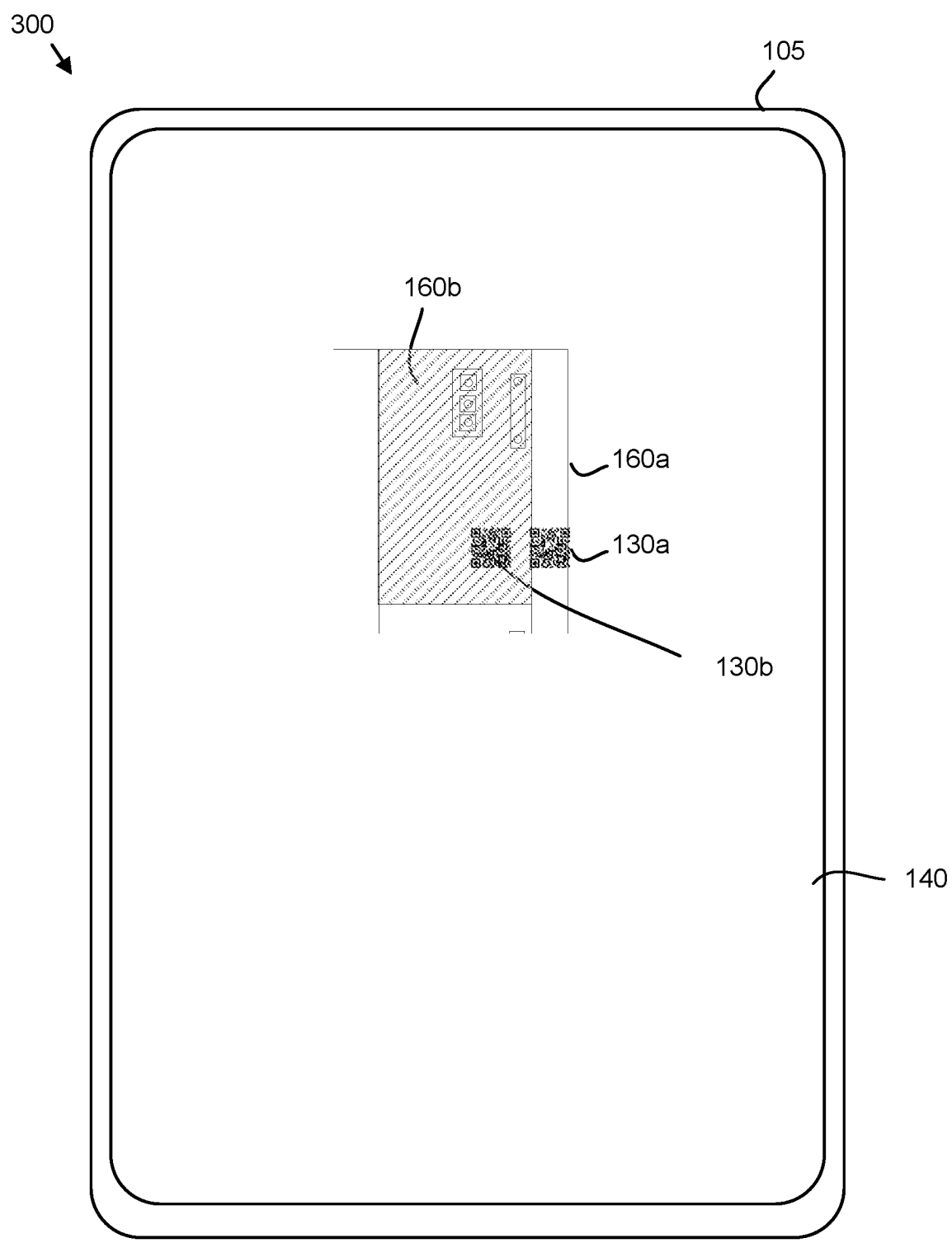
FIG. 3B is a front view drawing of an electronic device displaying an equipment panel according to an embodiment.

FIG. 3B is a front view drawing of an electronic device 105 displaying an equipment panel 300. The camera 135 may capture an image 145 of one or more equipment instances 160 and corresponding equipment tags 130. In addition, the electronic device 105 may receive an equipment reference code 205 for a given equipment instance 160. The electronic device 105 may identify the equipment tags 130 in the image 145. The electronic device 105 may further identify a given equipment tag 130 corresponding to the given equipment reference code 205 in the image 145.

The electronic device 105 may further emphasize the given equipment instance 160b presented in the display 140. In the depicted embodiment, the given equipment instance 160b is highlighted in the display 140. The highlighting may increase the perceived luminescence of the given equipment instance 160b. Alternatively, the highlighting may decrease the perceived luminescence of the given equipment instance 160b. In one embodiment, the highlighting may modify a color of the given equipment instance 160b.

The given equipment instance 160b may also be one or more of highlighted, modulated, outlined, and annotated in the display 140. For example, the given equipment instance 160b may be modulated between increased luminescence and decreased luminescence. In addition, the given equipment instance 160 may be modulated between a first color and a second color. The given equipment instance 160 may be outlined with the border of increased luminescence, decreased luminescence, a modified color, a specified color such as red or white, and the like. In one embodiment, the given equipment instance 160b is annotated with a label. In addition, other equipment instances 160 around the given equipment instance 160b may be obscured and/or not displayed as shown in the depicted embodiment.

In one embodiment, a side portion of the display 140 is emphasized if the given equipment instance 160b is not within the field-of-view of the display 140. For example, if the given equipment instance 160b is to the left of the electronic device 105, the left side portion of the display 140 may be emphasized to direct the user to change the field-of-view of the electronic device 105 to include the given equipment instance 160b In one embodiment, if the given equipment instance 160b is obscured by other equipment instances 160 in the field-of-view of the electronic device 105, the obscuring equipment instances 160 may be presented as partially transparent and the given equipment instance 160b may be presented through the transparent obscuring equipment instances 160.

Figure 3C:
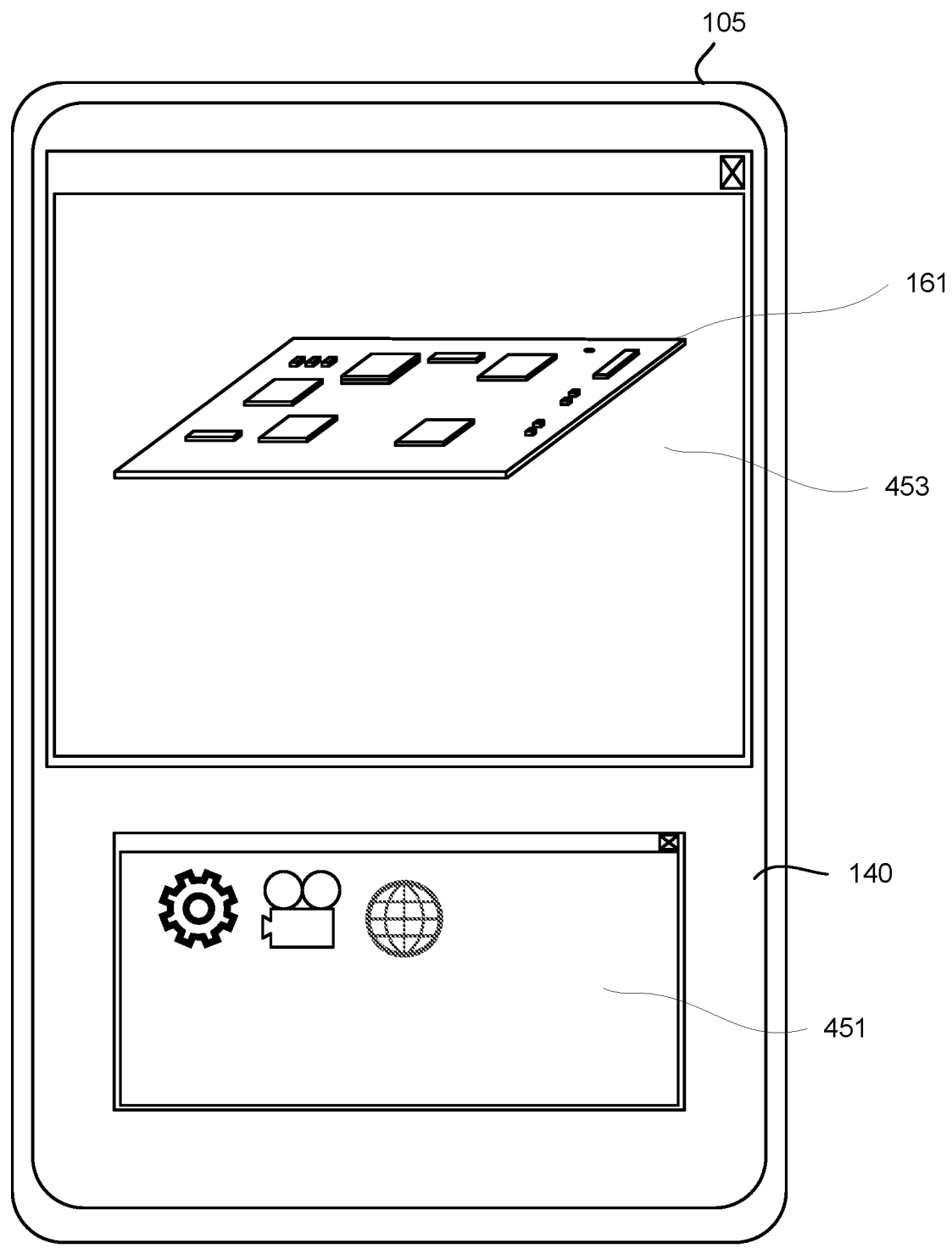
FIG. 3C is a front view drawing of an electronic device displaying an interior view and a menu according to an embodiment.

FIG. 3C is a front view drawing of an electronic device 105 presenting an interior view 453 and a menu 451 in the display 140. The interior view 453 and the menu 451 are representative of reference data 220 that may be presented in the display 140. The interior view 453, menu 451, and/or other reference data 220 may be presented for a given equipment instance 160b. In the depicted embodiment, the interior view 453 presents an equipment element 161 for the interior view 453.

In one embodiment, the electronic device 105 automatically presents a top-level menu 451 in response to emphasizing the given equipment instance 160b in the image presented in the display 145.

Figure 3D:
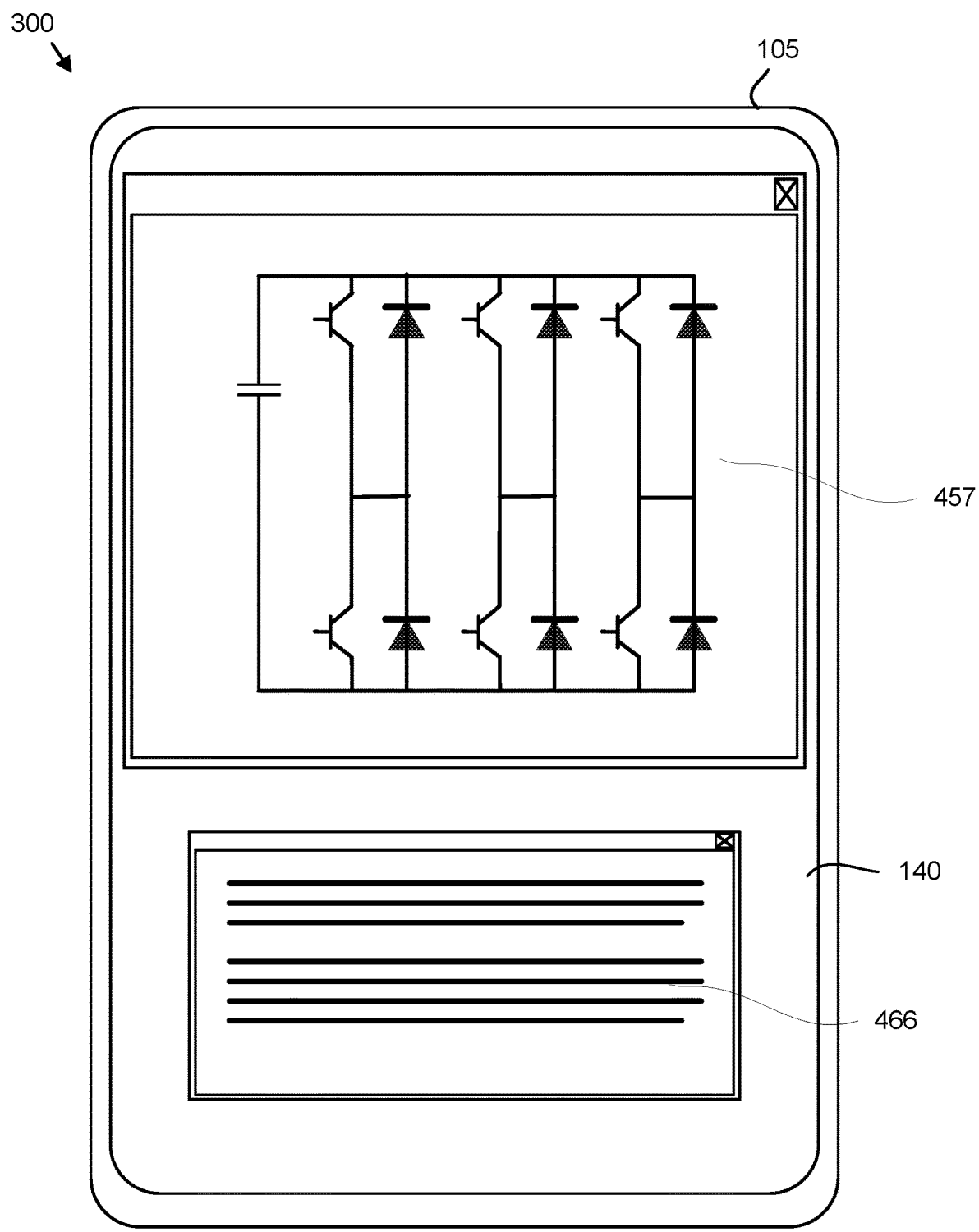
FIG. 3D is a front view drawing of electronic device displaying a schematic drawing and a document according to an embodiment.

FIG. 3D is a front view drawing of electronic device 105 displaying a schematic drawing 457 and a document 466. The schematic drawing 457 may represent the given equipment instance 160b. Alternatively, the schematic drawing 457 may represent a selected equipment element 161 of the given equipment instance 160b. The document may be one or more of the user manual 463, the operations manual 465, the diagnostic manual 467, the installation manual 469, and the warranty information 471.

Figure 3E:
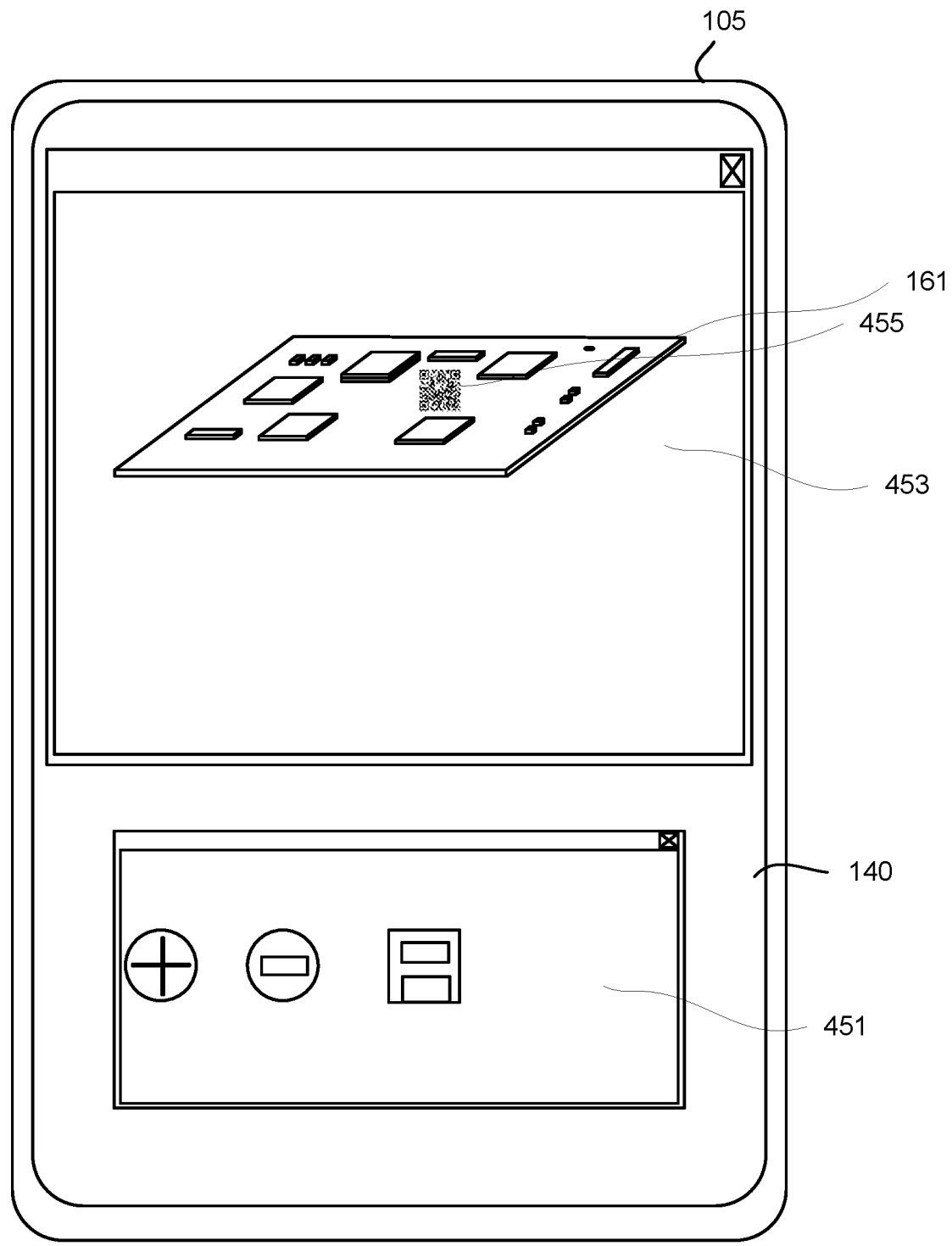
FIG. 3E is a front view drawing of electronic device displaying an interior view with the virtual tag and a menu according to an embodiment.

FIG. 3E is a front view drawing of electronic device 105 presenting an interior view 453 with the virtual tag 455 and a menu 451 that corresponds to the virtual tag 455. In the depicted embodiment, the interior view 453 is a circuit board equipment element 161. The virtual tag 455 is associated with the equipment element 161. The virtual tag 455 may also be associated with a second unique equipment reference code 205. The virtual tag 455 is presented by the display 140 as though disposed on the equipment element 161. If the user selects the virtual tag 455, the electronic device 105 may present reference data 220 for the equipment element 161. In the depicted embodiment, the electronic device 105 presents a menu 451 that corresponds to the virtual tag 455 and/or the equipment element 161.

Figure 3F:
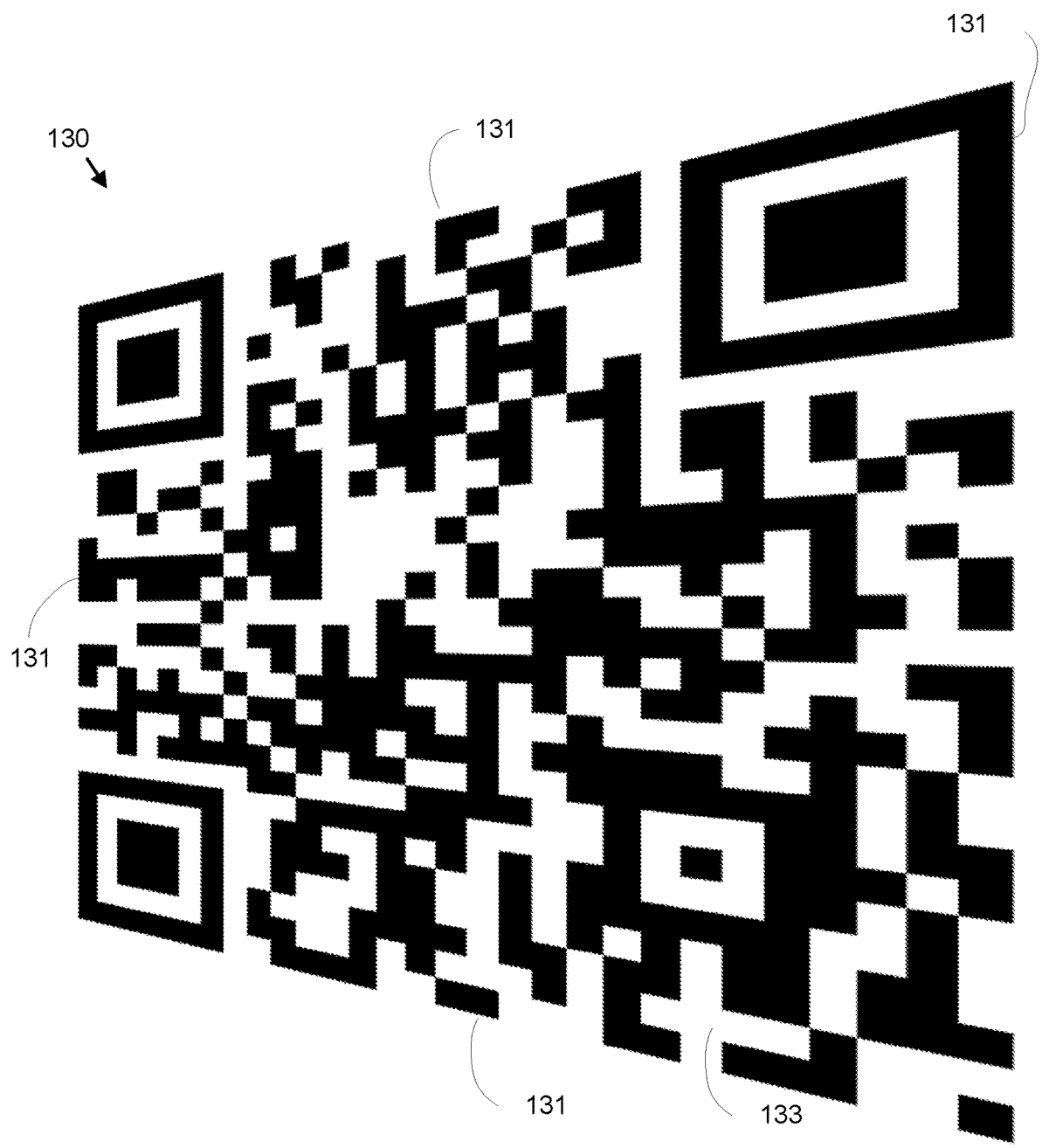
FIG. 3F is a perspective view drawing of an equipment tag according to an embodiment.

FIG. 3F is a perspective view drawing of an equipment tag 130. In the depicted embodiment, the equipment tag 130 is a QR code that is viewed by the camera 135 at an angle from a distance. The equipment tag 130 has a perceived area 133. In addition, the equipment tag 130 has perceived edges 131, and each perceived edge 131 has a perceived length and a perceived angle relative to the camera 135.

Figure 4:
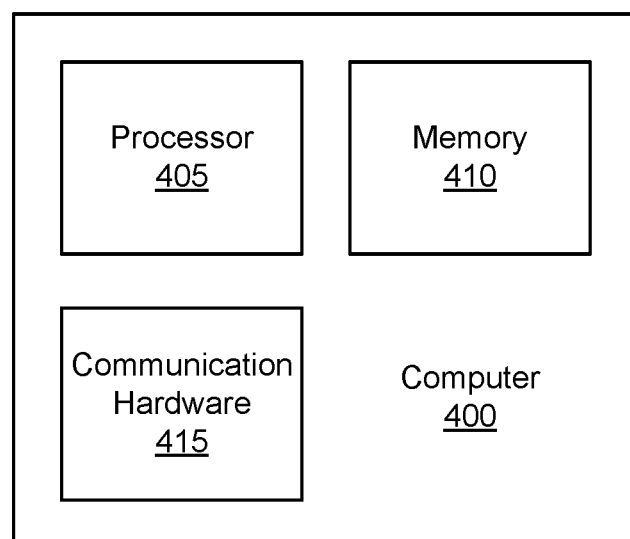
FIG. 4 is a schematic block diagram of the computer according to an embodiment.

FIG. 4 is a schematic block diagram of the computer 400. The computer 400 may be embodied in the electronic device 105. In addition, the computer 400 may be embodied in the server 120 and/or an equipment instance 160. In the depicted embodiment, the computer 400 includes a processor 405, a memory 410, and communication hardware 415. The memory 410 may include a semiconductor storage device, an optical storage device, a hard disk drive, a micromechanical storage device, or combinations thereof. The memory 410 may store code. The processor 405 may execute the code. The communication hardware 415 may communicate with other devices and/or the network 115. For example, the communication hardware 415 of the electronic device 105 may communicate with the network 115 and the server 120.

Figure 5A:
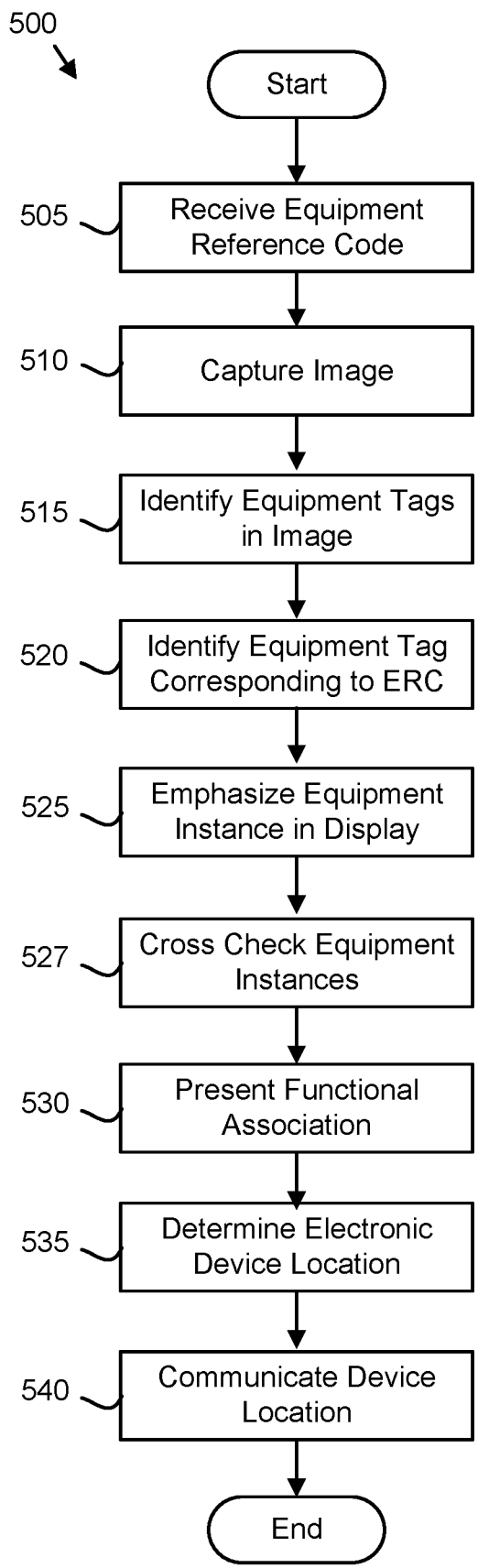
FIG. 5A is a schematic flowchart diagram of an equipment emphasis method according to an embodiment.

FIG. 5A is a schematic flowchart diagram of an equipment emphasis method 500. The method 500 may identify the given equipment tag 130 that corresponds to a given equipment reference code 205. In addition, the method 500 may emphasize the given equipment instance 160 on which the equipment tag 130 is disposed when the given equipment instance 160 is presented on the display 140. The method 500 may further determine the device location 433 of the electronic device 105. The method 500 may be performed by the computer 400 and/or the processor 405 of one or more of the electronic device 105, the server 120, and the electronic instance 160.

The method 500 starts, and in one embodiment, the processor 405 receives 505 a given equipment reference code 205. In a certain embodiment, the given equipment reference code 205 is scanned by the camera 135 of the electronic device 105. Alternatively, the given equipment reference code 205 may be entered by a user. In one embodiment, the given equipment reference code 205 is received 505 in an electronic communication to the electronic device 105.

In one embodiment, the processor 405 receives 505 two or more a given equipment reference codes 205. The two or more given equipment reference codes 205 may indicate equipment instances 160 with a functional association. For example, the given equipment reference codes 205 for a slot and the device that should be mounted in the slot may be received 505.

The processor 405 may capture 510 the image 145 using the camera 135. In one embodiment, the camera 135 is continuously capturing 510 images 145 of the physical environment as a video stream. In a certain embodiment, the camera 135 captures 510 the image 145 in response to a command from the user. The command may be a voice command.

The processor 405 may identify 515 one or more equipment tags 130 in the image 145. Each equipment tag 130 may be disposed on an equipment instance 160. In addition, each equipment tag 130 may correspond to a unique equipment reference code 205.

In one embodiment, the processor 405 identifies 515 the one or more equipment tags 130 by decoding each equipment tag 130. The processor 405 may further parse the code data 201 from each equipment tag 130. In an alternative embodiment, the processor 405 may parse the equipment reference code 205 from each equipment tag 130 and use the equipment reference code 205 as an index to the code database 200 to retrieve the code data 201.

The processor 405 may identify 520 a given equipment tag 130 that corresponds to the given equipment reference code 205. The given equipment tag 130 may include the given equipment reference code 205. In one embodiment, the processor 405 identifies 520 two or more given equipment tags 130 that correspond to the two or more given equipment reference codes 205.

The processor 405 may emphasize 525 the given equipment instance 160 in the image 145 presented in the display 140. The given equipment instance 160 may be emphasized 525 in the display 140 as shown in FIG. 3B. The given equipment instance 160 may be emphasized 525 by one or more of highlighting the given equipment instance 160, modulating the given equipment instance 160, outlining the given equipment instance 160, and annotating the given equipment instance 160. In addition, the given equipment instance 160 may be emphasized 525 by one or more of highlighting the given equipment tag 130, modulating the given equipment tag 130, outlining the given equipment tag 130, and annotating the given equipment tag 130.

In one embodiment, the processor 405 cross checks 527 the two or more equipment instances 160 with a functional association. The processor 405 may further present 530 the functional association of the two or more equipment instances 160. In one embodiment, the processor 405 presents 530 an indication that the functional association is correct. For example, if the device mounted in the corresponding slot, the processor 405 may present 530 an indication that the functional association is correct. A correct functional association may be indicated by a color such as green. However, if the device is not mounted in the corresponding slot, the processor 405 may present 530 an indication that the functional association is not correct. The incorrect functional association may be indicated by a color such as red.

The processor 405 may determine 535 the device location 433 of the electronic device 105. In one embodiment, the device location 433 is set to the tag location 427 of the given equipment tag 130. In addition, the device location 433 may be modified from the tag location 427 based on the image 145. For example, the processor 405 may estimate the orientation of the equipment tag 130 relative to the electronic device 105 as a function of the perceived edges 131 of the equipment tag 130.

In addition, the processor 405 may estimate a distance from the equipment tag 130 to the electronic device 105 based on the perceived size 133 of the equipment tag 130. The processor 405 may modify the device location 433 based on the orientation of the equipment tag 130 and the distance from the equipment tag 130. The processor 405 may determine the device location DL 433 as shown in Equation 2, wherein MO is an orientation matrix, TL is the tag location 427, and D is a distance from the electronic device 105 to the equipment tag 130.

$$DL=DMO+TL \qquad \text{Equation 2}$$

The processor 405 may communicate 540 the device location 433 and the method 500 ends. In one embodiment, the device location 433 is communicated 540 to the user. In addition, the device location 433 may be communicated 540 to the server 120. In one embodiment, the device location 433 is communicated 540 in an electronic message to a person and/or process that is seeking the user and/or the electronic device 105.

Figure 5B:
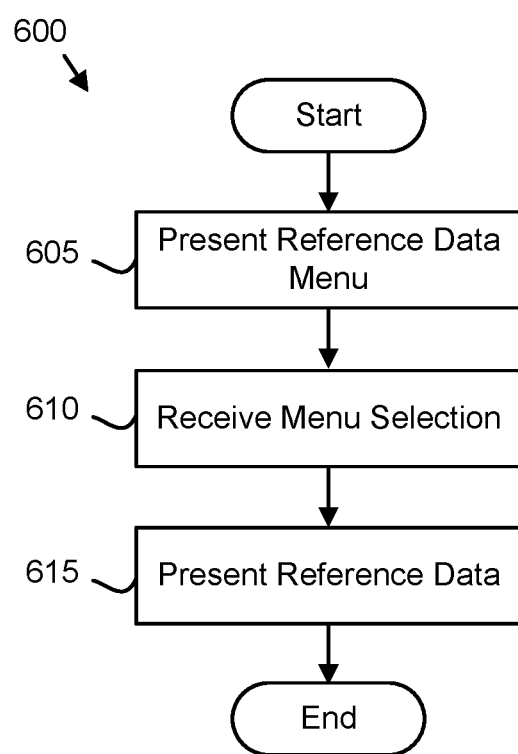
FIG. 5B is a schematic flow chart diagram of a reference data presentation method according to an embodiment.

FIG. 5B is a schematic flow chart diagram of a reference data presentation method 600. The method 600 may present reference data 220 on the display 140 of the electronic device 105. The method 600 may be performed by the computer 400 and/or the processor 405 of one or more of the electronic device 105, the server 120, and the electronic instance 160.

The method 600 starts, and in one embodiment, the processor 405 present 605 a reference data menu 451. The menu 451 may correspond to the given equipment instance 160. In addition, the menu 451 may be presented 605 in response to emphasizing the given equipment instance 160 in the image 145 presented on the display 140. In one embodiment, a top-level menu 451 is automatically presented 605 in response to emphasizing the given equipment instance 160.

The processor 405 may further receive 610 a menu selection from the menu 451. In one embodiment, the menu selection specifies reference data 220 desired by the user. In response to the menu selection, the processor 405 may present 615 the selected reference data 220 and the method 600 ends. In one embodiment, the reference data 220 is presented on the display 140 and may be navigated using one or more menus 451 and/or controls.

Figure 5C:
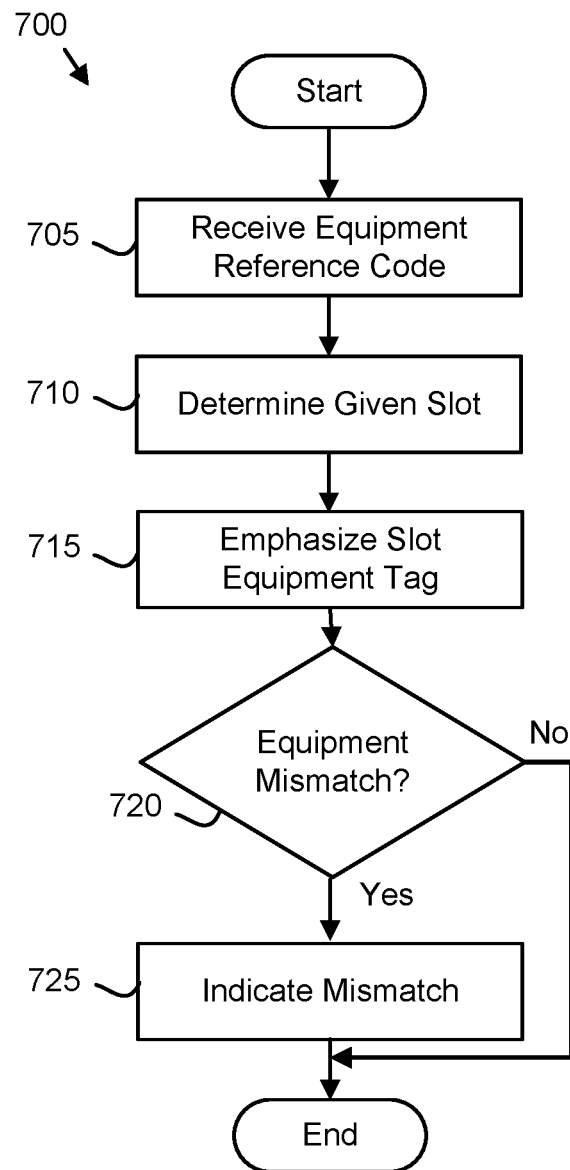
FIG. 5C is a schematic flow chart diagram of a mismatch indication method according to an embodiment.

FIG. 5C is a schematic flow chart diagram of a mismatch indication method 700. The method 700 may detect and indicate a mismatch between a device equipment instance and a slot equipment instance. The method 700 may be performed by the computer 400 and/or the processor 405 of one or more of the electronic device 105, the server 120, and the electronic instance 160.

The method 700 starts, and in one embodiment, the processor 405 receives 705 an equipment reference code 205. The equipment reference code 205 may be for a device equipment instance. Alternatively, the equipment reference code 205 may be for a slot equipment instance.

The processor 405 may determine 710 a given slot that corresponds to the equipment reference code 205. The given slot may receive the given equipment instance 160 associated with the equipment reference code 205. Alternatively, if the equipment reference code 205 is for a slot equipment instance 160, the processor 405 determines 710 the slot equipment instance 160 is the given slot.

The processor 405 may emphasize 715 the equipment tag 130 for the given slot in the display 140. In addition, the processor 405 may emphasize 715 the slot equipment instance 160. As a result, the user may easily identify the given slot.

In one embodiment, the processor 405 determines 720 if there is an equipment mismatch between the device equipment instance 160 and the slot equipment instance 160. In one embodiment, the processor 405 consults the equipment panel data 437 to determine if the device equipment instance 160 is associated with the slot equipment instance 160. If there is no mismatch, the method 700 ends.

If the processor 405 determines 720 there is an equipment mismatch, the processor 405 indicates 725 the mismatch on the display 140 and the method 700. The mismatch may be indicated 725 with an annotation describing the mismatch that is presented on the display 140. In addition, the mismatch may be indicated 725 by one or more of highlighting, modulating, and outlining the mismatched device and slot.

Figure 5D:
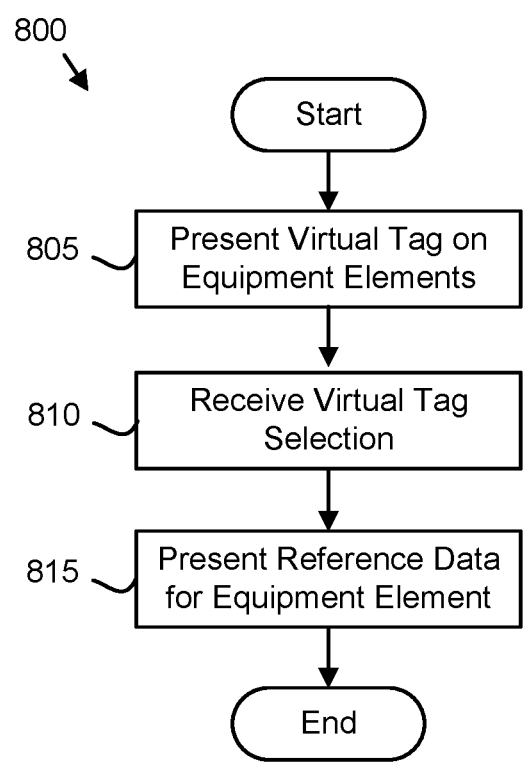
FIG. 5D is a schematic flow chart diagram of a virtual tag based reference data presentation method according to an embodiment.

FIG. 5D is a schematic flow chart diagram of a virtual tag based reference data presentation method 800. The method 800 may present reference data 220 for an equipment element 161. The reference data 220 may be presented in response to the selection of a virtual tag 455. The method 800 may be performed by the computer 400 and/or the processor 405 of one or more of the electronic device 105, the server 120, and the electronic instance 160.

The method 800 starts, and in one embodiment, the processor 405 presents 805 a virtual tag 455 on an equipment element 161 of a given equipment instance 160. The virtual tag 455 may be presented 805 in response to a selection of an equipment instance 160. In one embodiment, the virtual tag 455 is presented 805 in response to a user need such as a risk presented by the equipment element 161. In a certain embodiment, the virtual tag 455 is presented 805 if the equipment element 161 is not visible to the electronic device 105. In addition, the processor 405 may present 805 virtual tags 455 for a plurality of equipment elements 161. In a certain embodiment, virtual tags 455 are only presented 805 for the given equipment instance 160. Alternatively, virtual tags 455 may be presented 805 for each equipment instance 160 within the display 140. The virtual tags 455 may be presented 805 as specified by the virtual tag map 473.

For example, the processor may present 535 a virtual tag 455 on a fuse equipment element 161 of the given equipment instance 160. The virtual tag 455 may be associated with a second equipment reference code 205. In addition, code data 201 and reference data 220 may be associated with the virtual tag 455. The processor 405 may present 805 the virtual tags 455 on the display 140 overlaying the equipment instance 160 in the display 140. In addition, the processor 405 may present 805 the virtual tags 455 overlaying corresponding equipment elements 161 in the display 140.

The processor 405 may receive 810 a selection of a virtual tag 455. The selection may be received from the user through the electronic device 105. In one embodiment, the user selects the virtual tag 455 by looking at the virtual tag 455 while issuing a command. The command may be activated by an icon control. Alternatively, the command may be a voice command. In addition, the virtual tag 455 may be selected by touching the virtual tag 455 on the display 140.

The processor 405 may present 815 the reference data 220 for the equipment element 161 and the method 800 ends. The reference data 220 may be presented on the display 140 as shown in FIG. 3E and may be navigated using the one or more menus 451 and/or controls.

Problem/Solution

A user may have difficulty identifying his location in a large industrial facility. In addition, the user may have difficulty identifying specific equipment instances 160 because many of the equipment instances 160 may be identical. In addition, many equipment instances 160 may have a similar appearance. As a result, valuable time may be lost locating the user and the desired equipment instance 160.

The embodiments described herein locate an electronic device 105 by identifying the equipment tag 130. In addition, the embodiments locate desired equipment instances 160 by identifying an equipment tag 130 that corresponds to an equipment reference code 205 of the desired equipment instance 160. The embodiments further emphasize the equipment instance 160 on a display 140 of the electronic device 105, enabling the user to readily locate a desired equipment instance 160. In addition, the embodiments may locate the electronic device 105 and the user from the tag location 427 for the equipment tag 130 of the equipment instance 160.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An augmented reality electronic device comprising:
    a camera that captures an image;
    a display that presents the image;
    a processor;
    a memory storing code executable by the processor to perform:
    receiving a given equipment reference code for a given equipment instance;
    identifying one or more equipment tags in the image, wherein each equipment tag corresponds to a unique equipment reference code;
    identifying a given equipment tag corresponding to the given equipment reference code in the image; and
    emphasizing the given equipment instance in the image presented on the display by highlighting the given equipment instance in the display by one or more of increased luminescence for the given equipment instance, decreased luminescence for the given equipment instance, outlining the given equipment instance, and modulating the given equipment instance.

2. The augmented reality electronic device of claim 1, the processor further determining a device location based on the given equipment tag.

3. The augmented reality electronic device of claim 1, the processor further presenting reference data for the given equipment instance.

4. The augmented reality electronic device of claim 3, wherein the reference data comprises one or more of a menu, an interior view, a schematic drawing, an elevation drawing, a pointer to operational data, a user manual, an operations manual, a diagnostics manual, an installation manual, and warranty information.

5. The augmented reality electronic device of claim 1, the processor further:
    presenting a virtual tag on an equipment element of the given equipment instance, wherein the virtual tag is associated with a second equipment reference code; and
    in response to a selection of the virtual tag, presenting reference data for the equipment element.

6. The augmented reality electronic device of claim 1, wherein the given equipment tag is associated with code data comprising one or more of a catalog identifier, a serial number, a device rating, a media access control (MAC) address, a manufacture date, warranty reference, a user manual reference, an operational reference, a diagnostic reference, an installation reference, a winding panel identifier, and identification vector, a tag location, a Universal Resource Locator (URL).

7. The augmented reality electronic device of claim 6, wherein the code data is encoded in the given equipment tag.

8. The augmented reality electronic device of claim 1, wherein the equipment tag is selected from the group consisting of a two-dimensional optical code, a Quick Response (QR) code, a bar code, a Universal Product Code (UPC), a BLUETOOTH® Low Energy (BLE) Tag, a Radio Frequency Identifier (RFID), a Near Field Communication (NFC) tag, and a Europay, Mastercard, Visa (EMV) tag.

9. The augmented reality electronic device of claim 1, wherein the equipment instance is selected from the group consisting of an equipment panel, a slot of the equipment panel, and a device disposed in the slot.

10. The augmented reality electronic device of claim 1, the processor further cross checking two or more equipment instances with a functional association.

11. The augmented reality electronic device of claim 1, the processor further:
    determining a given slot that receives the given equipment instance; and
    displaying a slot equipment tag for the given slot.

12. The augmented reality electronic device of claim 11, the processor further indicating a mismatch between the given equipment instance and a second slot receiving the given equipment instance.

13. A method comprising:
    receiving, by use of a processor, a given equipment reference code for a given equipment instance;
    identifying one or more equipment tags in an image, wherein each equipment tag corresponds to a unique equipment reference code;
    identifying a given equipment tag corresponding to the given equipment reference code in the image; and
    emphasizing the given equipment instance in the image presented on a display by highlighting the given equipment instance in the display by one or more of increased luminescence for the given equipment instance, decreased luminescence for the given equipment instance, outlining the given equipment instance, and modulating the given equipment instance.

14. The method of claim 13, the method further comprising determining a device location based on the given equipment tag.

15. The method of claim 13, the method further comprising presenting reference data for the given equipment instance.

16. The method of claim 15, wherein the reference data comprises one or more of a menu, an interior view, a schematic drawing, an elevation drawing, a pointer to operational data, a user manual, an operations manual, a diagnostics manual, an installation manual, and warranty information.

17. The method of claim 13, the method further comprising:
presenting a virtual tag on an equipment element of the given equipment instance, wherein the virtual tag is associated with a second equipment reference code; and
in response to a selection of the virtual tag, presenting reference data for the equipment element.

18. The method of claim 13, wherein the given equipment tag is associated with code data comprising one or more of a catalog identifier, a serial number, a device rating, a media access control (MAC) address, a manufacture date, warranty reference, a user manual reference, an operational reference, a diagnostic reference, an installation reference, a winding panel identifier, and identification vector, a tag location, a Universal Resource Locator (URL).

19. The method of claim 18, wherein the code data is encoded in the given equipment tag.

20. A computer program product comprising a non-transitory computer readable storage medium storing code readable/executable by a processor to perform:
receiving a given equipment reference code for a given equipment instance;
identifying one or more equipment tags in an image, wherein each equipment tag corresponds to a unique equipment reference code;
identifying a given equipment tag corresponding to the given equipment reference code in the image; and
emphasizing the given equipment instance in the image presented on a display by highlighting the given equipment instance in the display by one or more of increased luminescence for the given equipment instance, decreased luminescence for the given equipment instance, outlining the given equipment instance, and modulating the given equipment instance.

\* \* \* \* \*